March 30, 1965 J. S. HOGAN ETAL 3,176,241

MAGNETIC SWITCHING DEVICE

Filed April 7, 1961 6 Sheets-Sheet 1

Jimmie S. Hogan
Robert L. Hogan
INVENTORS

MAGNETIC SWITCHING DEVICE

Jimmie S. Hogan
Robert L. Hogan
INVENTORS

Jimmie S. Hogan
Robert L. Hogan
INVENTORS

Jimmie S. Hogan
Robert L. Hogan
INVENTORS

Jimmie S. Hogan
Robert L. Hogan
INVENTORS

Jimmie S. Hogan
Robert L. Hogan
INVENTORS 3,176,241
Patented Mar. 30, 1965

3,176,241

MAGNETIC SWITCHING DEVICE

Jimmie S. Hogan, 4501 Creekbend Drive, Houston, Tex., and Robert L. Hogan, Houston, Tex.; said Robert L. Hogan assignor to said Jimmie S. Hogan Filed Apr. 7, 1961, Ser. No. 101,474
3 Claims. (Cl. 331—75)

The present invention relates to a commutator and more particularly to a commutator comprising a movable member and means including a coil magnetically coupled to the movable member for switching current at selected positions of the movable member.

More particularly still the invention relates to an electronic commutator which is magnetically coupled with a movable member, or shaft, and operates without the need of brushes, slip rings, or any direct physical contact with the movable part.

A commutator is generally defined as a device for swtching current and is generally referred to as the brushes and attachment to a D.C. motor or dynamo armature for conveying and/or reversing current to the conductors. However, a commutator is not restricted to a motor or dynamo device and is defined herein as a device, including a movable member, for switching electric current. The electronic commutator described herein does not require brushes or direct physical coupling or contact between the movable body and the stationary body.

At the present time, many electric motors, position-indicating devices, and other instruments or equipment having direct switching functions require brushes, or contacts, with direct physical contact with the desired movable body that switches, or signals, at selected positions of the movable body. Such construction tends to decrease the operating efficiency for certain applications such as by the friction loss caused by brushes of a D.C. motor. Brushes and slip rings are also subject to wear, contamination, and general unreliability since they require physical contact with the movable body. Switching speed is also limited by switches requiring direct physical contact between moving parts. Commutators requiring brushes are also subject to arcing or sparking which is hazardous.

An object of the present invention is to provide a commutator which overcomes many of the objections of present-day commutators.

A further object of the present invention is to provide a commutator which does not require the use of brushes or direct physical contact with the movable member.

Still a further object of the present invention is to provide a brushless commutator for use on brushless D.C. motor and/or dynamos.

Still a further object of the present invention is to provide a brushless commutator for use on instruments or other equipment requiring direct switching functions.

Still a further object of the present invention is to provide a commutator capable of a faster switching speed.

Still a further object of the present invention is to provide a commutator without the open spark hazard.

Still a further object of the present invention is to provide a commutator without friction caused by physical contact between the moving parts.

Other objects and advantages of the present invention will become more readily apparent from a consideration of the following description and drawings wherein:

FIGURE 1 schematically illustrates an electronic commutator.

FIGURE 2 schematically illustrates an electronic commutator with components arranged differently from that of FIGURE 1.

FIGURE 3 schematically illustrates an electronic commutator with still a different arrangement of components.

FIGURE 4 schematically illustrates an electronic commutator suitable for operation with a rotatable member.

FIGURE 5 schematically illustrates a rotatable movable member of an electronic commutator.

FIGURE 6 schematically illustrates a different arrangement of a rotatable movable member of an electronic commutator.

FIGURE 7 schematically illustrates a flat, or linear, movable member of an electronic commutator.

FIGURE 8 schematically illustrates a still different arrangement of a rotatable movable member of an electronic commutator.

FIGURE 9 schematically illustrates a different arrangement of a flat movable member of an electronic commutator.

Figure 1:
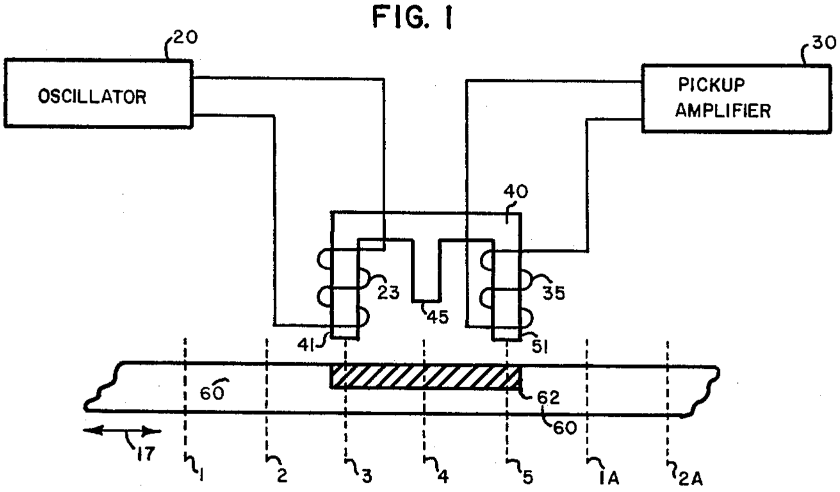

Attention is directed to FIGURE 1 of the drawings wherein a movable member made of non-magnetic material (such as plastic) is shown at 60 with an insert made of magnetic material (such as soft iron) shown at 62. The movable member is capable of movement to the left or the right of the viewer as indicated by arrow 17. Adjacent to member 60, a structure made of magnetic material is shown at 40 with projections 41, 45, and 51. The structure 40 is located adjacent to the movable member so that it is magnetically coupled with insert 62 when located between lines 3 and 5 as in the position shown. An oscillator is shown at 20 with a coil 23 around structure extension 41 to induce an oscillating magnetic field in extension 41. Thus, extension 41 is an exciter arm. Extension 51 of structure 40 is provided to receive oscillation signals of exciter arm 41 when insert 62 is adjacent to both extensions 41 and 51. Thus, extension 51 is a pick-up arm. This magnetic oscillation signal received by pick-up 51 induces a current in coil 35 and a pick-up amplifier is shown at 30 to amplify and/or utilize, as desired, the current induced in coil 35.

Magnetic oscillations of exciter 41 will take the path of least resistance and extension 45 is provided on structure 40 to shield pick-up 51 from these oscillations by providing a shorter path for them. Thus, extension 45 is a magnetic shield.

This invention as schematically illustrated by FIGURE 1 operates as follows: the oscillating magnetic field of exciter 41 induced by coil 23 normally oscillates between exciter 41 and shield 45, and pick-up 51 does not normally receive these magnetic oscillations; however, when the position of the movable member 60 is so located that insert 62 is adjacent to both extensions 41 and 51, the oscillations of exciter 41 are conveyed by insert 62 to pick-up 51 and, accordingly, a current is induced in coil 35. On receipt of the current in coil 35, pick-up amplifier 30 then performs its function of switching, amplifying, or otherwise utilizing, as desired, the signal from coil 35.

As disclosed above, and for practical purposes of operating this invention, no current is induced in coil 35 unless magnetic insert 62 is so located between extensions 41 and 51 to provide an easier path for the magnetic flux to travel than through extension 45. It can be readily seen by the drawing of FIGURE 1 that without the magnetic insert 62 the magnetic flux of exciter 41 will proceed to shield 45 since the air gap between exciter 41 and shield 45 is much shorter than between exciter 41 and pick-up 51; however, with insert 62 adjacent to both extensions 41 and 51, the combined air gaps between extensions 41 and 51 and insert 62 are shorter than the air gap between extensions 41 and 45 and, accordingly, the magnetic flux of exciter 41 will then proceed to pick-up 51.

It has been found that the distance separating exciter 41 and pick-up 51 and the physical size and shape of structure 40 and exciter 41 and pick-up 51 can vary considerably without violating the concept of this invention. If, for example, exciter 41 and pick-up 51 are separated enough, it can be seen that shield 45 can be shortened considerably and may even be omitted.

As disclosed above, insert 62 will only convey magnetic flux from exciter 41 to pick-up 51 when insert 62 is located between lines 3 and 5, as shown in FIGURE 1, so that insert 62 is adjacent to both extensions 41 and 51. For example, if insert 62 were in positions 1 and 3, magnetic oscillations received by pick-up 51 would be negligible and pick-up amplifier 30 would not function. Nor would pick-up amplifier 30 function if insert 62 were in positions 2 and 4, 4 and 1A, or 5 and 2A. Of course, insert 62 could be made longer in order to hold a longer switching period, if desired.

Therefore, it has been shown that the present invention, as schematically illustrated by FIGURE 1, is an electronic commutator and can perform the functions of past commutators but does not require brushes or direct physical contact with the moving part.

Figure 2:
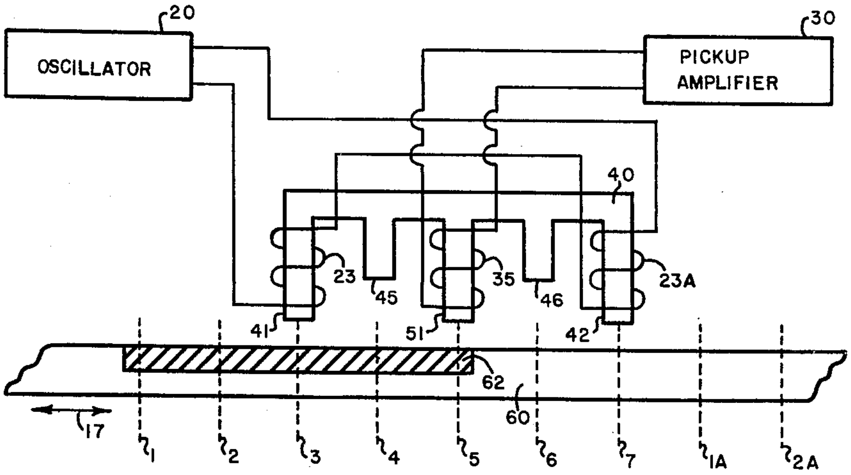

Attention is now directed to FIGURE 2 of the drawings which schematically illustrates an electronic commutator with components arranged differently from that of FIGURE 1. The components of FIGURE 2 which are the same as FIGURE 1 are marked with the same numbers as in FIGURE 1 and the main difference is that shield 46, exciter 42, and oscillator coil 23A have been added to the electronic commuator of FIGURE 2. It is noted that oscillator coils 23 and 23A are connected in series and are jointly operated by oscillator 20. Thus, exciter arms 41 and 42 are simultaneously induced with magnetic oscillations by oscillator 20.

Exciters 41 and 42 are provided on each side of pick-up 51 so that pick-up 51 will receive oscillation signals from either exciter 41 or exciter 42 if magnetic insert 62 is adjacent to pick-up 51. And, of course, shield 46 has been added between pick-up 51 and exciter 42 so that pick-up 51 will not receive oscillation signals from exciter 42 unless insert 62 is adjacent to both extensions 51 and 42.

The electronic commutator of FIGURE 2 operates as follows: the oscillating magnetic field of exciter 41 induced by coil 23 is conveyed by insert 62 to pick-up 51 and induces a current in coil 35 when insert 62 is located between positions 1 and 5, as shown. However, if insert 62 were located between positions 5 and 2A, then pick-up 51 would receive such oscillations from exciter 42. Therefore, pickup 51 will always receive magnetic oscillations as long as insert 62 is adjacent to it. It is noted that this is not so for the electronic commutator of FIGURE 1 wherein if insert 62 were in the position of 5 and 2A insert 62 would then be adjacent to pick-up 51 yet pick-up 51 would not receive magnetic oscillations. It should also be noted that if insert 62 of FIGURE 2 were located between positions 3 and 7, then pick-up 51 would receive magnetic oscillations from both exciters 41 and 42.

It can now be appreciated that the form of this invention schematically illustrated by FIGURE 2 differs in operation from that illustrated by FIGURE 1 since pick-up 51 of FIGURE 1 could be adjacent to insert 62 and yet not receive oscillation signals from exciter 41 unless insert 62 were also simultaneously adjacent to exciter 41, and pick-up 51 of FIGURE 2 will always receive an oscillation signal when adjacent to insert 62 because insert 62 would also then be adjacent to exciter 41 or 42.

Figure 3:
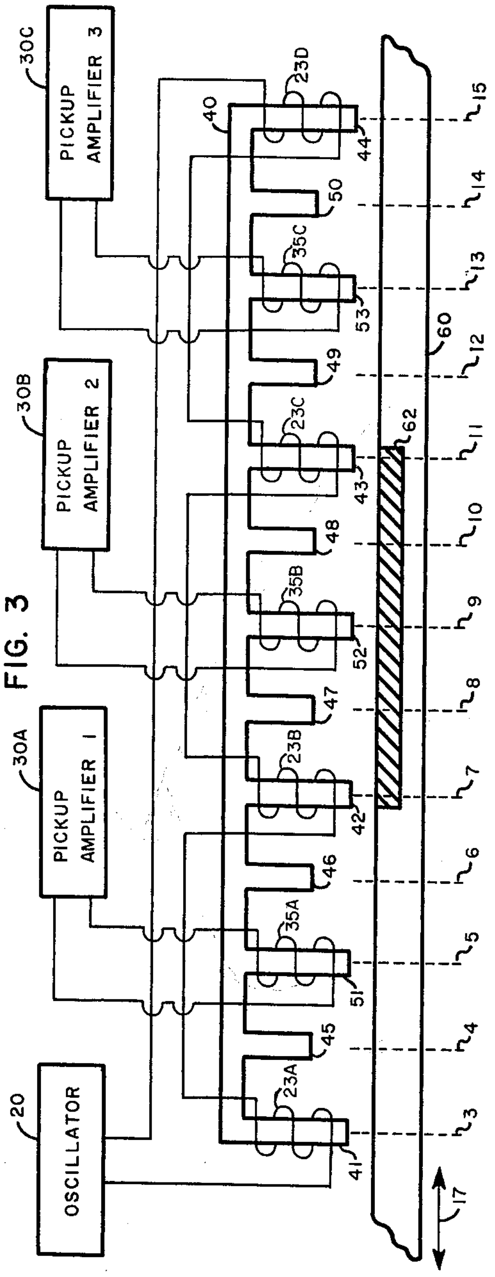

The form of invention illustrated by FIGURE 3 of the drawings is similar to that of FIGURE 2, with like components numbered the same, except structure 40 is provided with still additional exciters 43 and 44, shields 47, 48, 49, and 50, and pick-ups 52 and 53, and additional pick-up amplifiers 30–B and 30–C have been added to the circuitry. In practicing the form of invention as illustrated by FIGURE 3, inventors have found that a single oscillator 20 can be provided to simultaneously excite exciters 41 through 44 and, of course, many additional exciters could be operated by a single oscillator 20, or, separate oscillators could be provided for each exciter if desired. Inventors have also found that many pick-up arms can be provided on a single structure. Three such pick-up arms have been illustrated in FIGURE 3 by extensions 51, 52, and 53, and each of these pick-up arms is provided with a separate pick-up amplifier shown at 30A, 30B, and 30C respectively. It can now be appreciated that any number of exciter and pick-up arms can be provided on structure 40 in order to achieve the desired commutation results.

The electronic commutator of FIGURE 3 operates as follows: with insert 62 located as shown, pick-up 52 will receive oscillation signals from both exciters 42 and 43 since insert 62 in the position shown is adjacent to extensions 42, 52, and 43. However, with insert 62 located as shown, pick-ups 51 and 53 will not receive oscillation signals. As explained above, member 60 can move as indicated by arrow 17 and accordingly, insert 62 will transmit the oscillation signal to whichever pick-up arm it is adjacent.

It should be noted that two pick-up arms could be simultaneously receiving signals conveyed by insert 62 with the electronic commutator of FIGURE 3. For example, with insert 62 located between the positions 9 and 13, then both pick-ups 52 and 53 would receive magnetic oscillations from exciter 43. And, as before, the length of insert 62 can be varied in order to achieve the desired switching period.

Figure 4:
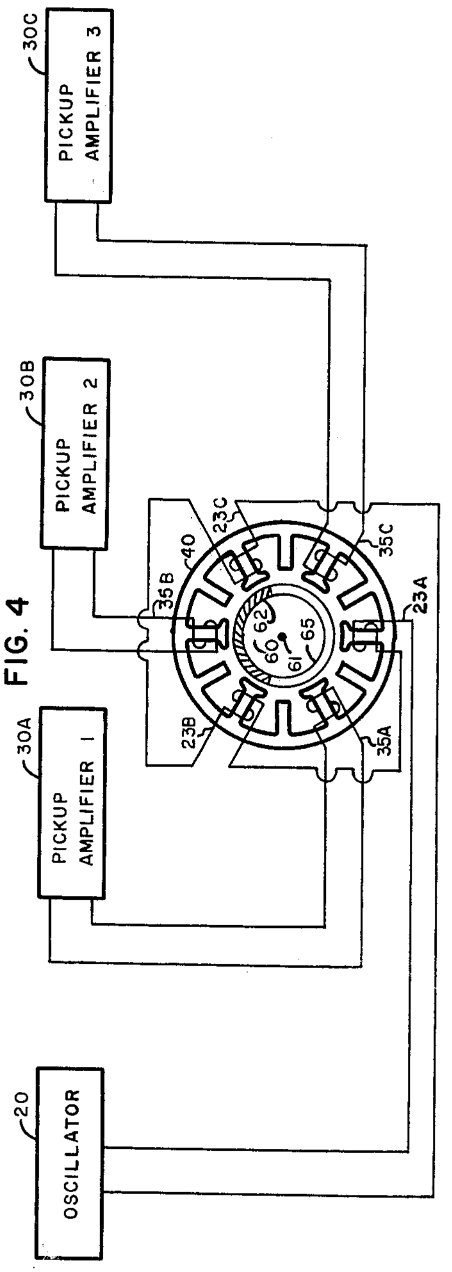

The electronic commutator illustrated by FIGURE 4 is similar to that of FIGURE 3, containing the same components and illustrated with the same number references, with the difference being that structure 40 is made in circular form so that member 60 can also be circular. The invention of FIGURE 4 can be used for commutation functions of a shaft or rotor and uses the same principle of operation as the circuits illustrated by the previous figures. That is, insert 62, on rotating member 60, will transmit magnetic oscillations to whichever pick-up arm it is adjacent.

FIGURES 5, 6, 7, 8, and 9 illustrate various forms of the member 60 that can be used with this invention. In FIGURES 5, 6, 7, 8, and 9, the main member is represented at 60 with magnetic insert shown at 62, and for illustrative purposes, each figure is provided with structure 40 containing exciter 41, pick-up 51, and shield 45.

Figure 5:
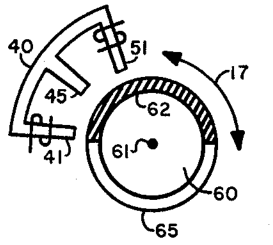

FIGURE 5 illustrates a circular member that can be used with the form of the present invention such as FIGURE 4. Member 60 of FIGURE 5 is provided with shaft 61 for use in rotating member 60 as indicated by arrow 17. Additional coupling and bearing means for shaft 61 are not shown in detail since it is assumed that suitable provisions can be made for mounting and rotating member 60. Magnetic insert 62 of FIGURE 5 is shown extending 180° around member 60; however, it can be appreciated that insert 62 can be made for any desirable coverage of member 60 and that even several inserts 62 may be used with any desired spacing. It can also be appreciated that although structure 40 of FIGURE 5 is shown with a single exciter and pick-up that any number of exciter and pick-up arms with any desired separation could be provided. Member 60 of FIGURE 5 is also provided with a magnetic shielding insert, such as copper, shown at 65, which may be used optionally to furnish additional shielding characteristics.

Figure 6:
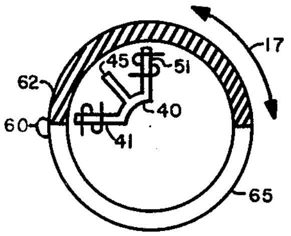

FIGURE 6 illustrates a circular member that can be used similar to that of FIGURE 5 except that the member of FIGURE 6 is mounted to encircle the structure 40.

This is shown only to illustrate how the electronic commutator could be applied to external rotors such as those that are used on some of the present day aircraft gyro instruments.

Figure 7:
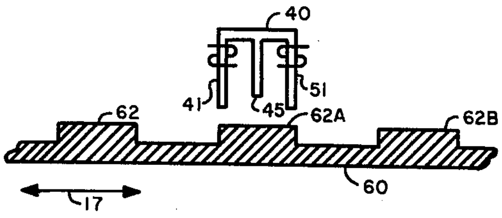

FIGURE 7 illustrates a different form of a flat, or linear, movable member wherein member 60 is made of magnetic material and is provided with extensions 62, 62A, and 62B. In this case, the voids between movable member 60 extensions serve to turn the pick-up oscillations off and, of course, extensions 62, 62A, or 62B will turn the pick-up oscillations on when adjacent to the exciter and pick-up arms.

Figure 8:
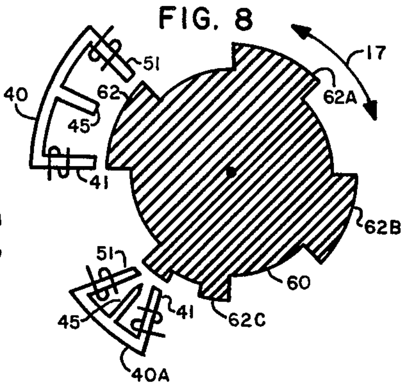

The movable member illustrated by FIGURE 8 is similar to that of FIGURE 7 except the member shown by FIGURE 8 is in circular form for operation with a rotational movement around shaft 61 as shown by arrow 17. Member 60 is made of magnetic material and is provided with voids to turn the pick-up oscillations off and is provided with extensions 62, 62A, 62B, and 62C to turn the pick-up oscillations on when adjacent to the exciter and pick-up arms. It is noted that the shape of extension 62C differs from the other structure 60 extensions shown by FIGURE 8 to further illustrate that the shape and size of the magnetic part of the movable member can vary considerably in order to fulfill the desired commutation function.

Figure 9:
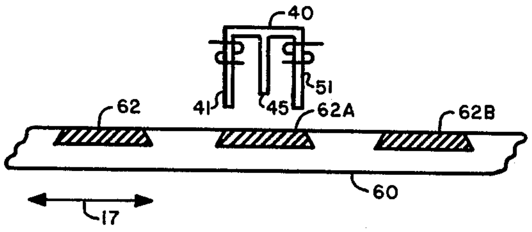

FIGURE 9 illustrates movable member 60 with a different arrangement of magnetic inserts 62, 62A, and 62B to further illustrate that the shape, size and arrangement of the movable member can vary considerably without departing from the scope of the present invention.

It should also be noted that the size and shape of the structures (40 and 40A) shown by FIGURES 5, 6, and 8 are different from each other and this further illustrates that the size and shape of these structures can vary considerably in order to fulfill the desired commutation function without departing from the scope of this invention.

Figure 10:
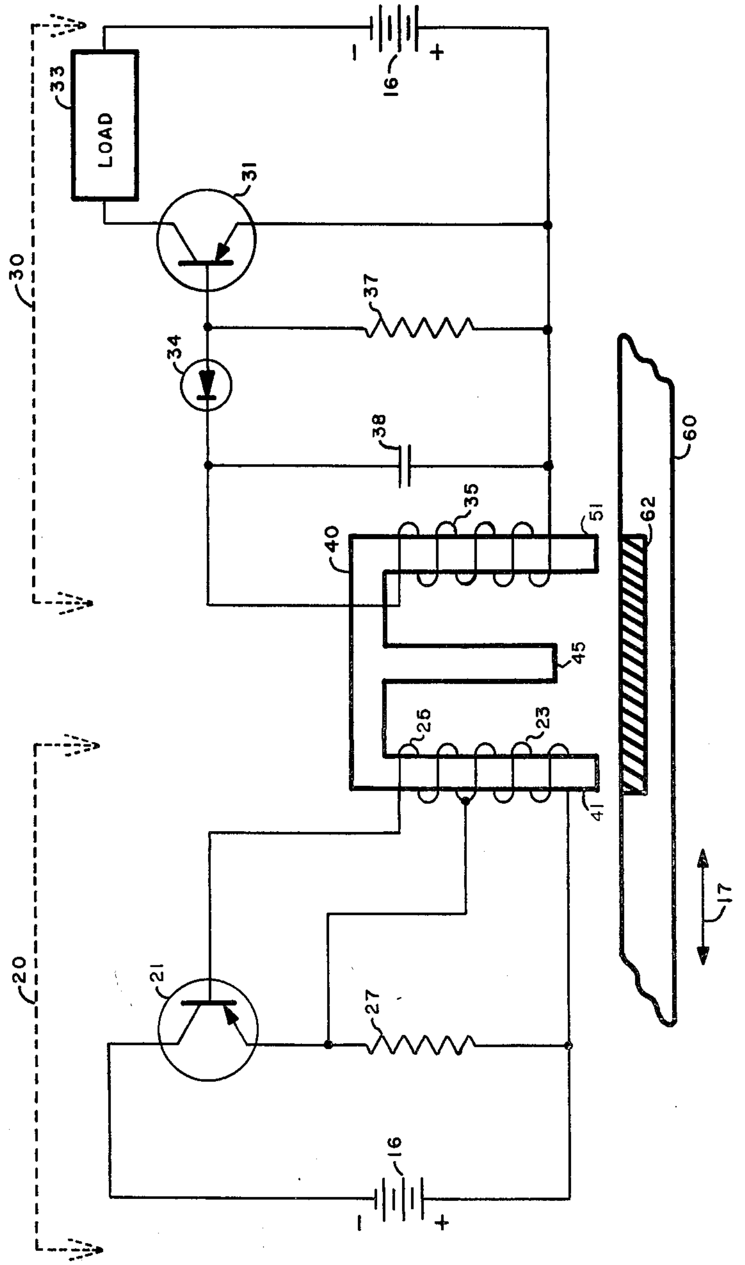
FIGURE 10 is an electronic commutator circuit schematic.

Attention is now directed to FIGURE 10 of the drawings wherein one form of the oscillator 20 and pick-up amplifier 30 circuitry is illustrated. It should be noted here that oscillator 20 may be any electronic oscillator capable of inducing magnetic oscillations of adequate magnitude in the exciter arm. The oscillation frequency may also vary considerably, depending mainly on the size, shape, and characteristics of the exciter and pick-up structure. Therefore, the oscillator 20 circuit of FIGURE 10 is illustrated only to indicate one basic oscillator circuit.

The circuit of oscillator 20 shown by FIGURE 10 includes a power source indicated by battery 16, a transistor shown at 21, an exciter coil 23, a control coil 25, and a resistor 27. This is a basic oscillator circuit, readily recognizable by those skilled in the art, so only the following basic description of this oscillator operation is given: transistor 21 is a PNP transistor with the collector connected to the negative terminal of battery 16, the emitter connected to the positive terminal of battery 16, and the base connected to the positive terminal of battery 16 through coils 25 and 23; coils 25 and 23 are magnetically coupled to each other by exciter arm 41; the coupling connection of coils 25 and 23 permits the generation of sustained variations of oscillations by the switching of transistor 21 by coil 25, and no additional external signal source is needed since the oscillator output acts in itself as the charging source through coil 23. This oscillator is basically a Hartley type circuit and can be refined additionally by adding a capacitor (not shown) across coils 23 and 25.

The pick-up amplifier circuit may be any form of electronic circuit capable of amplifying and/or switching on receipt of the signal received in coil 35. One form of such circuit is illustrated by pick-up amplifier 30 shown in FIGURE 10 wherein the circuit includes a power source shown as a battery 16, a transistor shown at 31, a resistor 37, a capacitor 38, pick-up coil 35, a diode 34, and a load 33. Amplifier 30 shown in FIGURE 10 works as follows: the current induced in coil 35 (conveyed by insert 62, when in the selected position, from oscillator coil 23) is amplified by transistor 31 and is utilized by load 33 for indicating, driving, signalling, or as otherwise required; transistor 31, as shown, is normally off since the base and emitter are both connected to the positive side of battery 16, however, the oscillating current induced in coil 35 impresses a more negative voltage on the transistor's base than its emitter and turns the transistor on; diode 34 is used to rectify the oscillating signal from coil 35 so that the transistor remains in a constant on state while said signal is received; capacitor 38 is used to tune the frequency of coil 35 to be resonant with the oscillator frequency and intensify the coil 35 signal; resistor 37 is used to bias the transistor base to a non-conducting state when signals are not received by coil 35. If a pulsative D.C. output to load 33 is acceptable, or desired, it may be obtained by omitting diode 34 and resistor 37.

It can be appreciated that the entire amplifier unit 30 may be omitted if the signal induced in coil 35 is strong enough to obtain the desired results and capacitor 38 and diode 34 may then be added optionally to rectify and/or intensify said signal.

Figure 11:
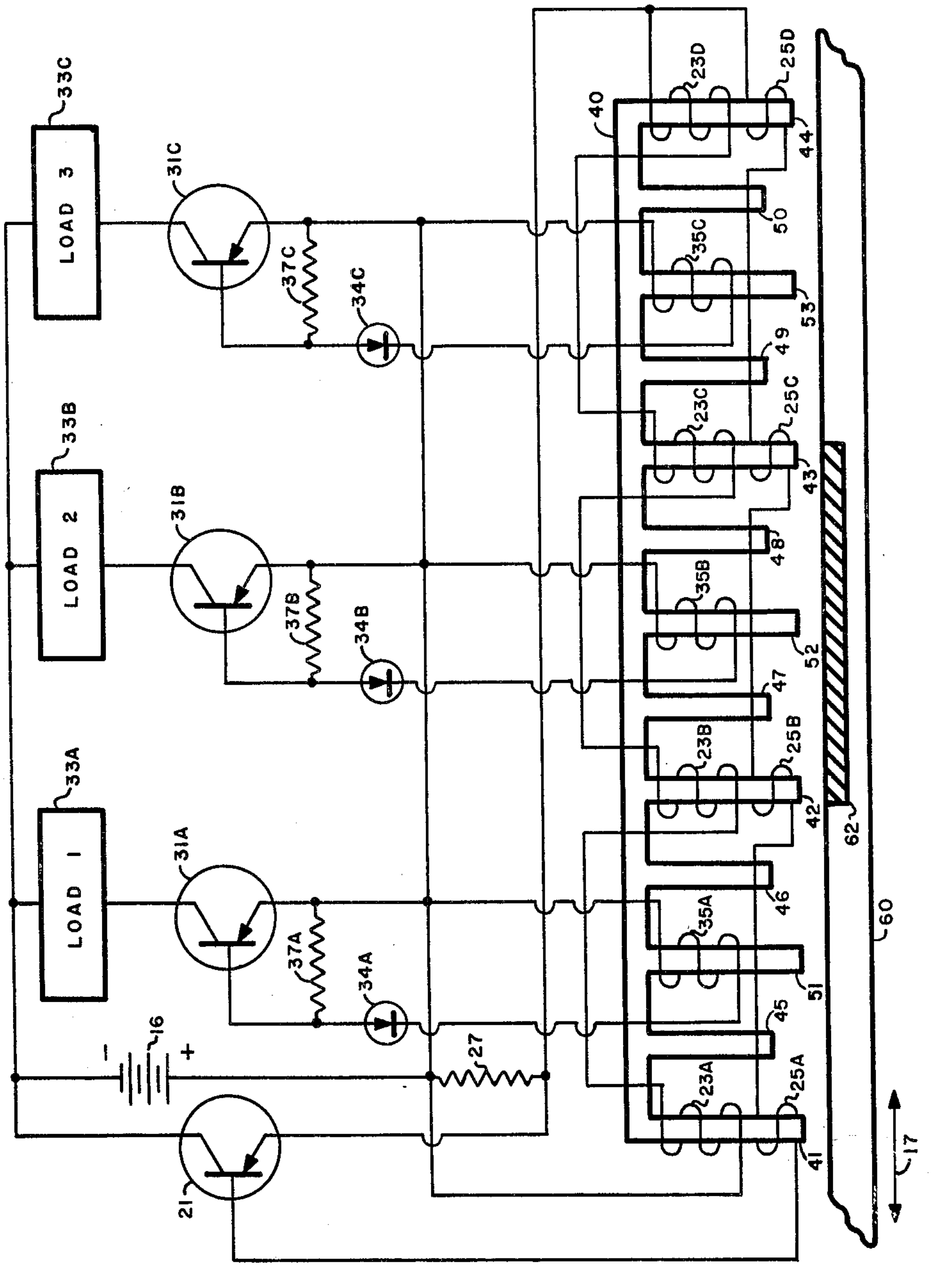
FIGURE 11 is an electronic commutator circuit schematic with a different arrangement of components.

The form of invention illustrated by FIGURE 11 of the drawings is similar to that of FIGURE 10, with like components numbered the same, except the electronic commutator illustrated by FIGURE 11 is provided with multiple pick-ups. This illustrates one form of the detail circuitry that could be used for electronic commutators requiring multiple pick-ups for use on such devices as previously illustrated by FIGURES 3 and 4. As previously stated, oscillator coils may be connected in series and this is illustrated here by oscillator coils 23A, 23B, 23C, and 23D. Oscillator control coils 25A, 25B, 25C, and 25D are also connected in series. Pick-up coils 35A, 35B, and 35C control transistors 31A, 31B, and 31C, respectively, and whichever pick-up coil, or coils, receives the oscillation signal turns its transistor on. As previously stated, additional oscillator and pick-up arms could be added to this device and otherwise the operation of the FIGURE 11 device is the same as that of FIGURE 10.

Figure 12:
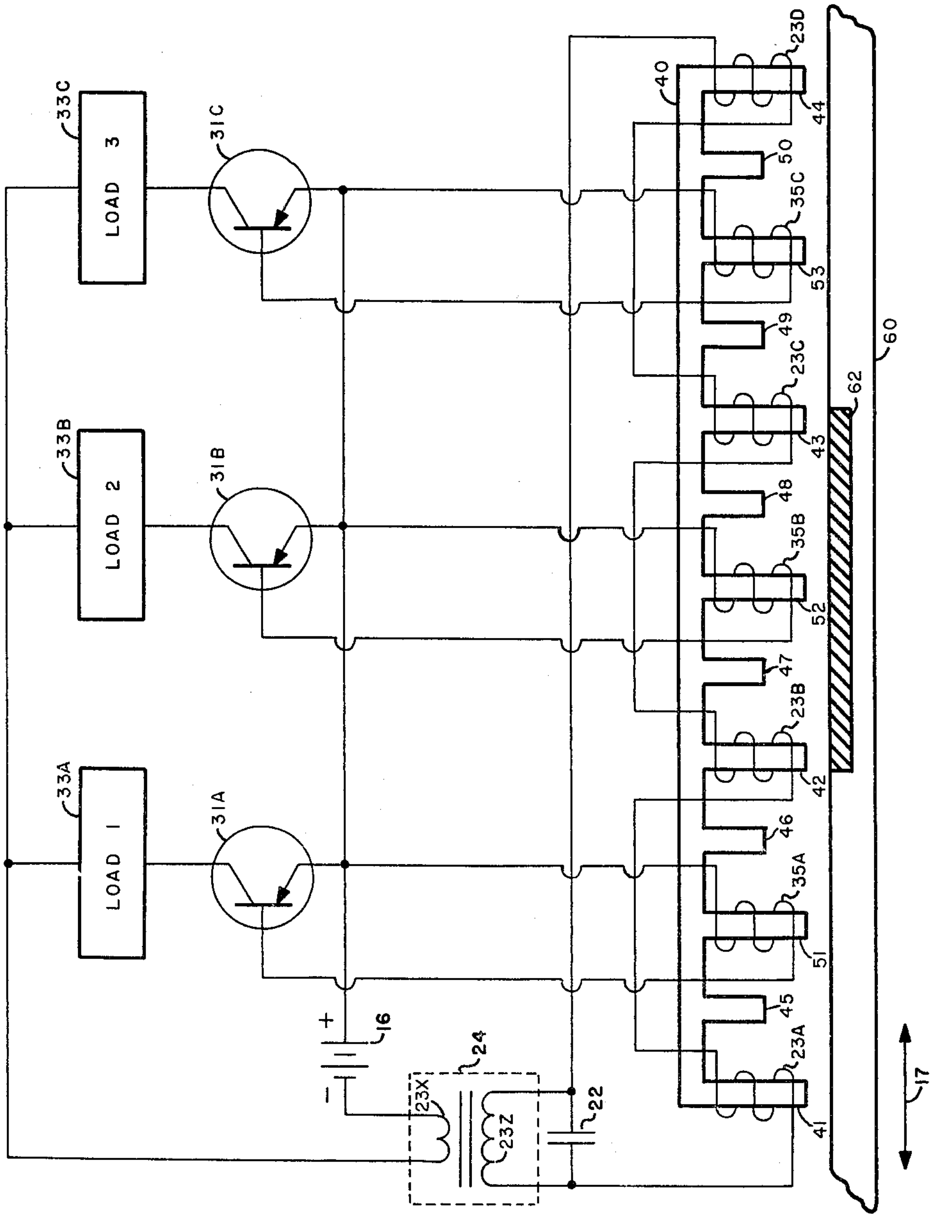
FIGURE 12 is an electronic commutator circuit schematic with still a different arrangement of components.

The form of invention illustrated by FIGURE 12 of the drawings is similar to that of FIGURE 11, with like components numbered the same, except that the oscillator transistor has been omitted and replaced by a control transformer shown at 24. The output to load for this device is a pulsative D.C. output and this pulsative current must travel through the control transformer primary coil shown at 23X. Control transformer secondary coil shown at 23Z picks up the pulsations of coil 23X (coils 23Z and 23X being magnetically coupled to each other) and transmits said oscillations to oscillator coils 23A, 23B, 23C, and 23D. Control transformer 24 is a step-up transformer with the voltage induced in secondary coil 23Z adequate for driving the oscillator coils and capacitor 22 is provided to intensify the oscillations. It has been found that for very small signalling devices the control transformer 24 may be omitted and the primary coil 23X may become the oscillating coil or coils.

Therefore, the electronic commutator of FIGURE 12 works as follows: when the circuit is completed or first turned on (master switch not shown), driving transistors (31A, 31B, and 31C in this case) are shocked to a temporary conductive state; this temporary conduction to load which is a characteristic of transistors causes a current flow through transformer primary coil 23X; this current in coil 23X induces a current in secondary coil 23Z of higher voltage; the current in coil 23Z is conveyed by conductors (conductors shown but not numbered) to the various exciter coils; insert 62 is always adjacent to at least one pick-up arm, and whichever pick-up arm is adjacent to insert 62 causes its transistor to conduct; charging of structure 40 by the exciter coils starts an electromagnetic oscillation and pick-up arms adjacent to insert 62 receive such oscillations and accordingly turn associated transistors on; driving transistors are turned on in pulses, resonant with exciter oscillations, and thus no additional external oscillator source is needed since the driving transistor pulses act as the oscillation charging source through coil 23X.

The wires, or electrical conductors, connecting the various components as shown on all of the drawings are not numbered since the function and illustration of such conductors is obvious to those skilled in the art.

In practicing the present invention, inventors have had great success with operation of a brushless D.C. motor by utilizing the movable member 60 and structure 40 as illustrated by FIGURE 4 and the circuit illustrated by FIGURE 11. This motor operated as follows: loads 1, 2, and 3 of FIGURE 11 were connected to the motor field coils of a standard three-phase type motor (thus the motor was self-starting with a pre-selected direction of rotation); the motor rotor was a permanent magnet with permanently magnetized poles; movable member 60 made of paramagnetic material (plastic was used in some instances) in a circular form illustrated by FIGURE 4 was coupled to the motor rotor; the movable member was provided with a ferromagnetic section 62 and a magnetic shield 65; this was easily accomplished by soldering the ends of a thin strip of iron (to serve as insert 62) to the ends of a thin strip of copper (to serve as shield 65) to form a circular band and slipping said band over the circular member 60; the position of the ferromagnetic section of the member 60 was adjusted relative to the position of the rotor permanent magnet poles to energize the field coils for selected positions of the rotor poles; the movable member 60, coupled to and rotating with the motor rotor, conveys oscillating magnetic flux from exciter arms to whichever pick-up arms are adjacent to the ferromagnetic strip and thus controls the motor field coil loads by selectively switching transistors 31A, 31B, and 31C.

The present invention has been defined throughout the preceding specifications basically as having a movable member with a ferromagnetic section and a commutator structure and circuit magnetically coupled with the movable ferromagnetic section. It can be appreciated that the commutator structure and circuit could be movable and that the ferromagnetic section could be stationary or also slightly movable without departing from the scope of the present invention.

The ferromagnetic insert defined in the preceding specifications has been illustrated in the drawings by 62 as being a relatively thick insert. This was done for illustration purposes only since it has been found that the ferromagnetic section may in some cases be a very thin strip of ferromagnetic material attached to the movable member by any suitable means to make it adhere.

What is claimed is:

1. A device for switching electricity comprising:

(*a*) means for selectively energizing a first magnetic structure with a magnetic flux;

(*b*) pickup means, magnetically coupled with said structure to receive an induced current from said magnetic flux, coupled with said first named means to sustain a state of self-regenerative magnetic oscillations in said first structure by controlling said first named means in a relationship to the polarity of said induced current;

(*c*) a second magnetic structure attached to said first magnetic structure;

(*d*) shielding means to shield said second structure from said magnetic flux in said first structure by providing a preferred magnetic path;

(*e*) a circuit having windings magnetically coupled to said second structure to receive an induced current from magnetic flux in said second structure and operatively coupled with a semi-conductor to control the conductivity of said semi-conductor in a relationship with the polarity of said current induced in said windings;

(*f*) and magnetic conveying means, suitably mounted for movement relative to said second structure, having selected positions that cancel the effect of said shielding means by providing another preferred magnetic path that conveys said magnetic oscillations from said first structure to said second structure, for controlling the conductivity of said semi-conductor by said magnetic oscillations conveyed to said second structure by said conveying means when in said selected positions.

2. A device for switching electricity comprising:

(*a*) a magnetic structure having a plurality of first arms, each said first arm having exciter windings magnetically coupled therewith to induce a magnetic flux in said first arms and positioned in first selected positions relative to said structure body, and having a plurality of second arms positioned in other selected positions relative to said structure body so that the main paths of said magnetic flux induced in said first arms by said exciter windings do not normally traverse any of said second arms;

(*b*) a transformer having a primary winding and a secondary winding;

(*c*) a circuit, serially coupling said exciter windings with said secondary winding so that said magnetic flux is induced in said first arms by said exciter windings in a relationship to the output current of said secondary winding as electromagnetically induced by the input current of said primary winding;

(*d*) a plurality of second circuits, each second circuit having a semi-conductor with a main current carrying path serially coupled with a source of electric power and said primary winding so that said primary winding is energized by said electric power in relationship to the conductivity of said current carrying path, and a pickup winding magnetically coupled with a selected second arm to receive an electric pickup current by electromagnetic induction from magnetic flux in said selected second arm, and operatively coupled with said semi-conductor to control the conductivity of said current carrying path in relationship to the polarity of said electric pickup current;

(*e*) and a second magnetic structure, suitably mounted for movement relative to said first and second arms, to control the conductivity of selected said semi-conductors in a relationship to the position of said second magnetic structure by conveying said magnetic flux of said first arms through a preferred magnetic path to whichever second arm is adjacent to said second structure.

3. A device for switching electricity comprising:

(*a*) a magnetic structure having a first magnetic arm positioned in a selected position on the body of said structure, with an exciter winding magnetically coupled therewith to induce a magnetic flux in said first arm and a pickup winding magnetically coupled therewith to receive an induced current from said magnetic flux, and having a second magnetic arm positioned in another selected position on the body of said structure so that the main path of said first arm magnetic flux does not normally traverse said second arm;

(*b*) a first circuit to sustain said magnetic flux in said first arm in a state of magnetic oscillations, having a semi-conductor with a main current carrying path with an inlet and outlet terminal and a control terminal to control the conductivity of said current carrying path in relationship to the polarity of a current impressed on said control terminal, with said pickup winding serially coupled between said semi-conductor inlet and control terminals, and having a source of direct current with an inlet and outlet electrode with (1) said inlet electrode coupled to said semi-conductor outlet terminal (2) and said outlet electrode coupled to one end of said exciter winding (3) and the other end of said exciter winding coupled with said semi-conductor inlet terminal;

(*c*) a second circuit having a second semi-conductor with a main current carrying path with an inlet and outlet terminal and a control terminal to control the conductivity of its current carrying path in a relationship to the polarity of a current impressed on its control terminal, and having a control winding (1) serially coupled between the control and inlet terminals of said second semi-conductor (2) and magnetically coupled to said second arm to control the conductivity of the current carrying path of said second semi-conductor in relationship to current induced in said control winding by magnetic flux in said second arm;

(*d*) and a magnetic element, suitably mounted for movement relative to said first and second arms to control the conductivity of the current carrying path of said second semi-conductor in a relationship to the position of said element by conveying said magnetic flux from said first arm to said second arm for selected positions of said element.

References Cited by the Examiner

UNITED STATES PATENTS

| | | | |
|---|---|---|---|
| 1,227,844 | 5/17 | Simon | 336—132 |
| 1,716,553 | 6/29 | Higbee | 336—133 |
| 2,210,412 | 8/40 | Jones et al. | 323—51 |
| 2,401,175 | 5/46 | Morrill | 336—133 |
| 2,552,722 | 5/51 | King | 336—30 |
| 2,563,899 | 8/51 | Wiancko | 336—30 |
| 2,590,091 | 3/52 | Devol | 336—132 |
| 2,641,697 | 6/53 | Schurr | 336—113 |
| 2,905,874 | 9/59 | Kelling | 336—30 |
| 2,930,034 | 3/60 | Berman | 336—135 |
| 2,934,689 | 4/60 | Amico | 336—30 |
| 2,967,278 | 1/61 | Sullivan et al. | 331—75 |
| 2,992,369 | 7/61 | La Rocca | 336—30 |

ROY LAKE, *Primary Examiner.*

JOHN KOMINSKI, *Examiner.*